(12) United States Patent
Fu (10) Patent No.: US 12,557,056 B2
(45) Date of Patent: Feb. 17, 2026

(54) METHOD FOR TIMING SYNCHRONIZATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 313 days.

(21) Appl. No.: 17/817,255

(22) Filed: Aug. 3, 2022

(65) Prior Publication Data

US 2022/0377691 A1   Nov. 24, 2022

Related U.S. Application Data

(63) Continuation of application No. PCT/CN2020/077222, filed on Feb. 28, 2020.

(51) Int. Cl.
*H04W 56/00* (2009.01)
*H04W 74/0833* (2024.01)
*H04W 74/0836* (2024.01)
*H04W 74/0838* (2024.01)
*H04W 76/19* (2018.01)

(52) U.S. Cl.
CPC ....... *H04W 56/005* (2013.01); *H04W 56/001* (2013.01); *H04W 74/0833* (2013.01); *H04W 76/19* (2018.02); *H04W 74/0836* (2024.01); *H04W 74/0838* (2024.01)

(58) Field of Classification Search
None
See application file for complete search history.

(56) References Cited

U.S. PATENT DOCUMENTS

| | | | |
|---|---|---|---|
| 12,016,056 B2 * | 6/2024 | Wu | H04W 76/18 |
| 12,108,353 B2 * | 10/2024 | Sun | H04W 56/00 |
| 2019/0350003 A1 | 11/2019 | Jang et al. | |
| 2020/0267775 A1 | 8/2020 | Wang et al. | |
| 2020/0373992 A1 * | 11/2020 | Wang | H04W 80/02 |
| 2021/0105731 A1 * | 4/2021 | Lin | H04L 5/0087 |
| 2021/0345272 A1 * | 11/2021 | Chatterjee | H04W 80/02 |

(Continued)

FOREIGN PATENT DOCUMENTS

| | | |
|---|---|---|
| CN | 102378161 | 3/2012 |
| CN | 102905387 | 1/2013 |

(Continued)

OTHER PUBLICATIONS

CNIPA, First Office Action issued for CN Application No. 2022113983123, Jul. 29, 2023.

(Continued)

*Primary Examiner* — Jutai Kao
(74) *Attorney, Agent, or Firm* — Hodgson Russ LLP (57) ABSTRACT

A method for timing synchronization, a terminal device, and a network device are provided. The method for timing synchronization includes the following. The terminal device obtains timing advance (TA) information through a random access (RA) procedure. The terminal device performs timing synchronization through using the TA information.

9 Claims, 6 Drawing Sheets

200

OBTAIN, BY A TERMINAL DEVICE, TA INFORMATION THROUGH AN RA PROCEDURE — 210

PERFORM, BY THE TERMINAL DEVICE, TIMING SYNCHRONIZATION THROUGH USING THE TA INFORMATION — 220

(56) References Cited

U.S. PATENT DOCUMENTS

| | | | | |
|---|---|---|---|---|
| 2022/0287139 A1* | 9/2022 | Harris | ............... | H04W 76/27 |
| 2022/0369262 A1* | 11/2022 | Hong | ............... | H04W 56/0055 |
| 2023/0037995 A1* | 2/2023 | Awad | ............... | H04W 16/28 |
| 2024/0147395 A1* | 5/2024 | Singh | ............... | H04W 56/0065 |

FOREIGN PATENT DOCUMENTS

| | | |
|---|---|---|
| CN | 110536471 | 12/2019 |
| CN | 110547002 | 12/2019 |
| CN | 110574488 | 12/2019 |
| EP | 3644662 | 4/2020 |
| WO | 2019086039 | 5/2019 |
| WO | 2019091052 | 5/2019 |
| WO | 2019091502 | 5/2019 |
| WO | 2019097922 | 5/2019 |
| WO | 2019192708 | 10/2019 |
| WO | 2020019182 A1 | 1/2020 |

OTHER PUBLICATIONS

EPO, Office Action issued for EP Application No. 20920843.8, Oct. 2, 2023.
CNIPA, Rejection Notice for CN Application No. 202211398312.3, Jan. 2, 2024.
JPO, Office Action for JP Application No. 2022-549235, Mar. 8, 2024.
Qualcomm Incorporated, "Discussion of RAN1 LS on propagation delay compensation and way forward," 3GPP TSG-RAN WG2 Meeting #107bis, R2-1913645, Oct. 2019.
OPPO, "Consideration on propagation delay compensation for TSC," 3GPP TSG-RAN WG2 Meeting #109 electronic, R2-2000705, Feb. 2020.
ZTE Corporation et al., "Propagation Delay Compensation in TSC," 3GPP TSG-RAN WG2 Meeting #109 electronic, R2-2001212 (revision of R2-1914725), Feb. 2020.
Nokia et al., "Summary on accurate reference timing," 3GPP TSG-RAN WG2 Meeting #109e, R2-2002012, Feb. 2020.
JPO, Office Action for JP Application No. 2022-549235, Oct. 17, 2023.
EPO, Communication for EP Application No. 20920843.8, Mar. 28, 2024.
IPI, Office Action for IN Application No. 202227047786, Mar. 24, 2023.
WIPO, International Search Report and Written Opinion for International Application No. PCT/CN2020/077222, Nov. 18, 2020.
"3rd Generation Partnership Project; Technical Specification Group Radio Access Network; NR; Physical layer procedures for control (Release 17)," 3GPP TS 38.213, Mar. 2022, v17.1.0.
"3rd Generation Partnership Project; Technical Specification Group Radio Access Network; NR; NR and NG-RAN Overall Description; Stage 2 (Release 17)," 3GPP TS 38.300, Mar. 2022, v17.0.0.
"3rd Generation Partnership Project; Technical Specification Group Radio Access Network; NR; Medium Access Control (MAC) protocol specification (Release 17)," 3GPP TS 38.321, Mar. 2022, v17.0.0.
"3rd Generation Partnership Project; Technical Specification Group Radio Access Network; NR; Radio Resource Control (RRC) protocol specification (Release 17)," 3GPP TS 38.331, Mar. 2022, v17.0.0.
OPPO, "Contention resolution for C-RNTI included in msgA," 3GPP TSG-RAN WG2 Meeting #107, R2-1908769, Aug. 2019.
Mediatek Inc., "LBT and CAPC for Random Access in NR-U," 3GPP TSG-RAN2#103-BIS meeting, Tdoc R2-1813680, Oct. 2018.
Vivo, "Propagation delay compensation for reference time," 3GPP TSG-RAN WG2 Meeting #107bis, R2-1912311, Oct. 2019.
CMCC, "Remaining Issues for Propagation Delay Compensation," 3GPP TSG-RAN WG2 #109, R2-2001426, Feb. 2020.
EPO, Extended European Search Report for EP Application No. 20920843.8, Jan. 10, 2023.
EPO, Summons to oral proceedings for EP Application No. 20920843.8, Oct. 9, 2024.
JPO, Notice of Allowance for JP Application No. 2022-549235, Jul. 5, 2024.

* cited by examiner

| R | TIMING ADVANCE COMMAND | | OCT 1 |
| TIMING ADVANCE COMMAND | | UL GRANT | OCT 2 |
| UL GRANT | | | OCT 3 |
| UL GRANT | | | OCT 4 |
| UL GRANT | | | OCT 5 |
| TEMPORARY C-RNTI | | | OCT 6 |
| TEMPORARY C-RNTI | | | OCT 7 |

| OBTAIN, BY A TERMINAL DEVICE, TA INFORMATION THROUGH AN RA PROCEDURE | ~210 |

| PERFORM, BY THE TERMINAL DEVICE, TIMING SYNCHRONIZATION THROUGH USING THE TA INFORMATION | ~220 |

| TRANSMIT, BY A NETWORK DEVICE, TA INFORMATION THROUGH AN RA PROCEDURE, WHERE THE TA INFORMATION IS USED TO INSTRUCT THE TERMINAL DEVICE TO PERFORM TIMING SYNCHRONIZATION | 310 |

METHOD FOR TIMING SYNCHRONIZATION, TERMINAL DEVICE, AND NETWORK DEVICE

CROSS-REFERENCE TO RELATED APPLICATION(S)

This application is a continuation of International Application No. PCT/CN2020/077222, filed Feb. 28, 2020, the entire disclosure of which is incorporated herein by reference.

TECHNICAL FIELD

The disclosure relates to the field of communication, and more particularly to a method for timing synchronization, a terminal device, and a network device.

BACKGROUND

In certain scenarios, user equipment (UE) need to perform propagation delay compensation, such that a timing synchronization accuracy delta of a physical layer can be within a required range, so as to finally ensure that when time sensitive network (TSN) services are propagated in $5^{th}$ generation (5G) timing synchronization accuracy requirements can be satisfied. The UE can perform propagation delay compensation through using timing advance (TA) information which also called time alignment (TA) information. A manner in which the UE in an idle state obtains TA information is different from a manner in which the UE in a connected state obtains TA information. In the connected state, the UE obtains TA information according to a timing advance command (TAC) transmitted by a network, to perform synchronization alignment.

For an idle/inactive state, how to perform synchronization alignment by the UE is urgent to be solved.

SUMMARY

A method for timing synchronization, a terminal device, and a network device are provided in implementations of the disclosure.

A method for timing synchronization is provided in implementations of the disclosure. The method includes the following. A terminal device obtains TA information through a random access (RA) procedure. The terminal device performs timing synchronization through using the TA information.

A terminal device is provided in implementations of the disclosure. The terminal device includes a memory storing a computer program and a processor. The computer program is executed by the processor to cause the processor to obtain TA information through an RA procedure, and perform timing synchronization through using the TA information.

A network device is provided in implementations of the disclosure. The network device includes a memory storing a computer program, a transceiver, and a processor. The computer program is executed by the processor to cause the transceiver to transmit TA information through an RA procedure, where the TA information is used to instruct a terminal device to perform timing synchronization.

DETAILED DESCRIPTION

The following will illustrate technical solutions of implementations of the disclosure with reference to the accompanying drawings of implementations of the disclosure.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a next-generation communication $5^{th}$ generation (5G) system, or other communication systems.

Generally speaking, a conventional communication system generally supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations of the disclosure can also be applied to these communication systems.

Alternatively, a communication system in implementations of the disclosure can be applicable to a carrier aggregation (CA) scenario, a dual connectivity (DC) scenario, and a standalone (SA) scenario.

A spectrum applied is not limited in implementations of the disclosure. For example, implementations of the disclosure can be applied to a licensed spectrum and can also be applied to an unlicensed spectrum.

In implementations of the disclosure, each implementation is illustrated in conjunction with a terminal device and a network device, where the terminal device may also be called as a user equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, or the like. The terminal device may also be a station (ST) in the WLAN, a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, or a next-generation communication system, e.g., a terminal device in the NR network, a terminal device in a future evolved public land mobile network (PLMN), or the like.

As an example but not limitation, in implementations of the disclosure, the terminal device may also be a wearable device. The wearable device can also be called as a wearable smart device, which is a collective name of wearable devices intelligently designed and developed by applying a wearable technology to daily wear, such as glasses, gloves, watches, clothing, shoes, or the like. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets for physical sign monitoring, smart jewelry, or the like.

The network device can be used to communicate with a mobile device. The network device may be an access point (AP) in the WLAN, a base transceiver station (BTS) in the GSM or CDMA system, a NodeB (NB) in the WCDMA system, or an evolved NodeB (eNB or eNodeB) in the LTE system. Alternatively, the AN device 102 may also be a relay station, an AP, an in-vehicle device, a wearable device, a generation NodeB (gNB) in the NR network, or a network device in the future evolved PLMN.

In implementations of the disclosure, the network device provides a service to a cell, and the terminal device communicates with the network device through transmission resources (e.g., frequency-domain resources or spectrum resources) used by the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage range and low transmission power and are suitable for providing high-speed data transmission services.

Figure 1:
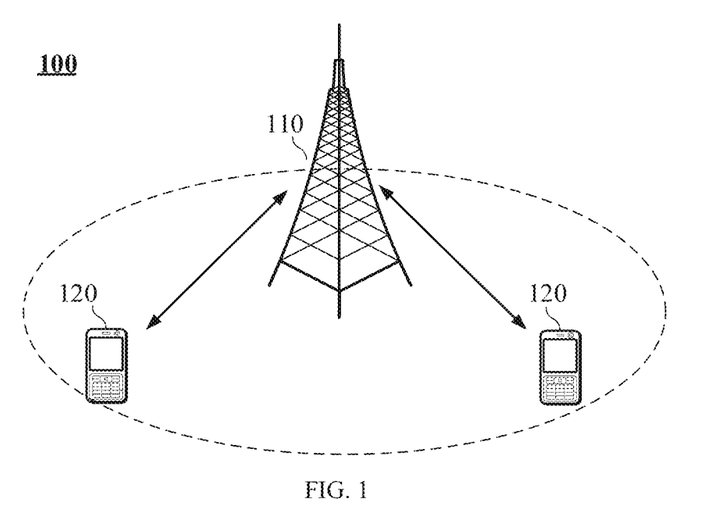
FIG. 1 is a schematic diagram illustrating an application scenario according to implementations of the disclosure.

FIG. 1 exemplarily illustrates a network device 110 and two terminal devices 120. Optionally, a wireless communication system 100 may include multiple network devices 110, and the other number of terminal devices 120 may be included in a coverage range of each of the multiple network devices 110, which will not be limited in implementations of the disclosure.

Optionally, the wireless communication system 100 may further include a mobility management entity (MME), an access and mobility management function (AMF) entity, or other network entities, which will not be limited in implementations of the disclosure.

It can be understood that, the terms "system" and "network" in this disclosure are often used interchangeably. The term "and/or" in this disclosure is simply an illustration of an association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

In the 5G industrial internet of things (IIoT), transmission of services in a 5G system, such as factory automation, transport industry, or electrical power distribution, is required to be supported. Based on propagation requirements of latency and reliability of the services, a time sensitive network (TSN) or time sensitive communication (TSC) is introduced in IIoT. In the TSN, a 5G network will be assigned as a TSN bridge to provide services for the TSN and TSN services. For this point, an NR system needs to provide lower latency guarantee and higher clock synchronization accuracy. As such, when industrial automation services are propagated in the 5G network, operations and succession of each point of mechanical operations are precise and satisfy time requirements.

The following will illustrate timing synchronization accuracy in the TSN.

Figure 2:
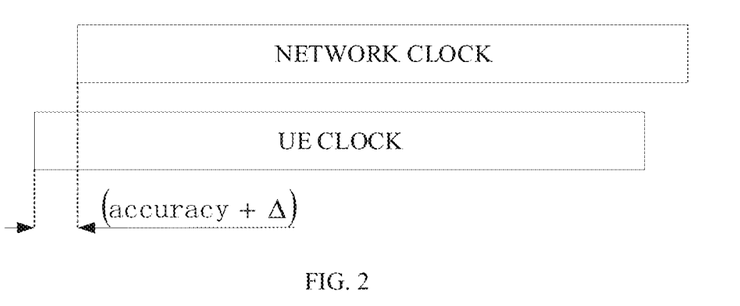
FIG. 2 is a schematic diagram illustrating a clock synchronization timing relation between a user equipment (UE) and a network.

According to propagation requirements of TSN services, when the TSN services are propagated in 5G, a timing synchronization accuracy requirement of 1 μs is required to be satisfied. As illustrated in FIG. 2, from the perspective of NR, whether the time accuracy of 1 μs can be achieved is related to timing synchronization accuracy informed by a network and a timing synchronization accuracy delta at a UE side. The synchronization delta at the UE side is determined by radio access network (RAN) 1, and is related to various factors, such as a propagation loss, a device limit, or the like.

Both timing synchronization information and timing synchronization accuracy information informed by the network are contained in a TimeReferenceInfo information element (IE).

According to a contact letter transmitted by RAN1, in certain scenarios, for example, in a scenario where a distance is greater than 200 meters, propagation delay compensation is required to be performed, such that a timing synchronization accuracy delta of a physical layer can be within a required range, so as to finally ensure that the timing synchronization accuracy requirement of 1 μs is satisfied when the TSN services are propagated in the 5G. For example, propagation delay compensation can be performed through using timing advance (TA) information.

According to a current conclusion, propagation delay compensation can be performed by the terminal device such as a UE. The UE determines a propagation delay to be compensated according to a value of the TA information. For example, a compensation value is 0.5TA or 0.5Nta.

The following will illustrate manners for obtaining the TA information.

In the communication system, propagation delay compensation is performed usually through using the TA information. A manner in which the UE in an unconnected state obtains TA information is different from that in which the UE in a connected state obtains TA information. When the UE is in an idle state or an inactive state, timing synchronization between the UE and a network side is not maintained, and thus the UE needs to obtain TA information in an initial access procedure through a random access (RA) procedure, to perform synchronization alignment. In the connected state, the UE obtains TA information according to a timing advance command (TAC) transmitted by the network, to perform synchronization alignment.

For example, a condition for triggering the RA procedure includes: initial access from radio resource control (RRC) idle (RRC IDLE); RRC connection re-establishment procedure; handover; downlink (DL) or uplink (UL) data arrival during RRC connected (RRC CONNECTED) when UL synchronization status is "non-synchronised"; transition from RRC inactive (RRC INACTIVE); to establish time alignment at secondary cell (SCell) addition; request for other scheduling indications (SIs) (see subclause 7.3); or beam failure recovery.

According to the TAC or the RA procedure, a UL-frame propagation advance value is $(N_{TA}+N_{TA\ offset})\times T_c$. $N_{TA}$ is related to the TAC or a TA command indicated by and carried in a random access response (RAR). The TAC has an index of TA adjustment. In a scenario where an RAR carries a TA command, $N_{TA}=T_A\cdot 16\cdot 64/2^\mu$, where $T_A$=TA command, and a value of $T_A$ is 0, 1, 2, . . . , 3846. In a scenario where a dedicated TAC medium access control (MAC) control element (CE) indicates a TA command, $N_{TA\ new}=N_{TA\ old}+(T_A-31)\cdot 16\cdot 64/2^\mu$, where $T_A$=TA command, and a value of $T_A$ is 0, 1, 2, . . . , 63.

In addition, $T_c$ is a minimum time unit in the physical layer and satisfies $T_c=1/(\Delta f_{max}\cdot N_f)$, where $\Delta f_{max}=480\cdot 10^3$ Hz, and $N_f=4096$.

Figure 3:
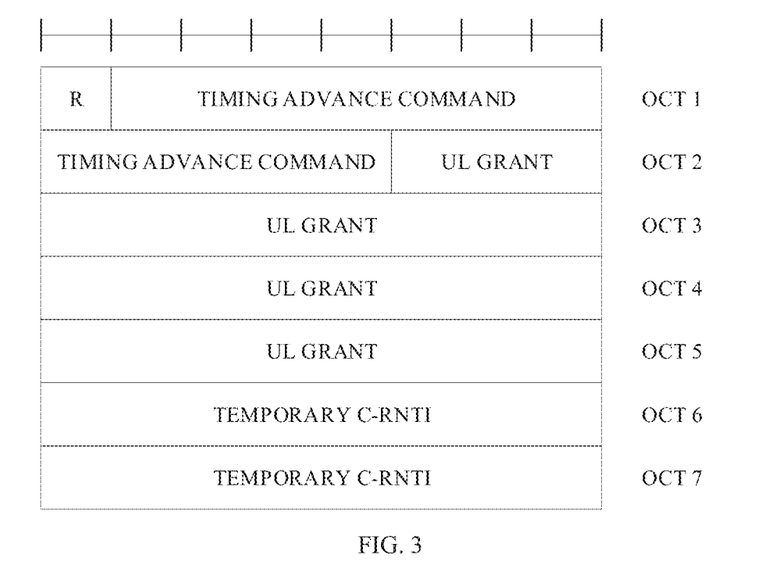
FIG. 3 is a schematic diagram illustrating a media access control (MAC) random access response (RAR).

Exemplarily, for an RAR format, reference can be made to FIG. 3, where the TA command occupies 12 bits.

Figure 4:
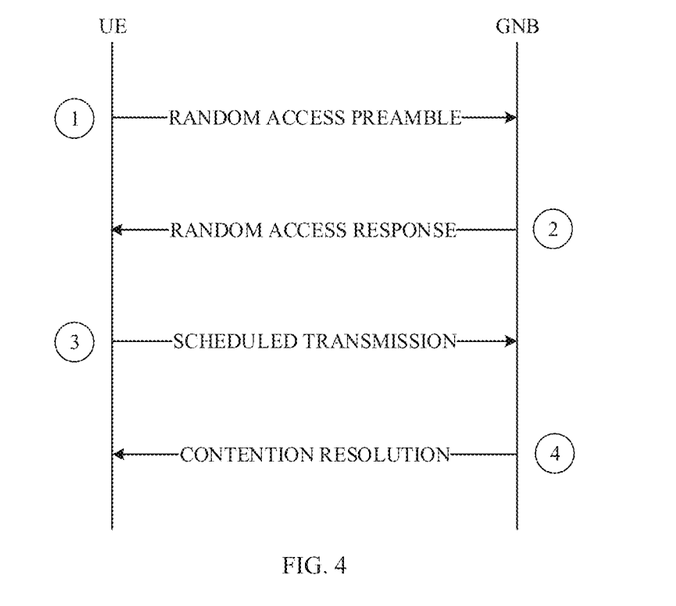
FIG. 4 is a schematic diagram illustrating a contention-based random access (RA) in a 4-step RA procedure.
Figure 5:
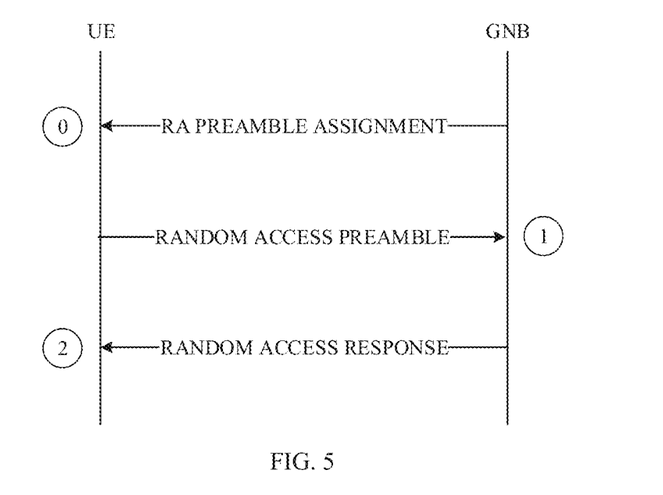
FIG. 5 is a schematic diagram illustrating a non-contention-based RA in a 4-step RA procedure.

In NR, an RA mode mainly supported includes a contention-based RA mode and a non-contention-based RA mode. A 4-step RA procedure in NR is illustrated in FIG. 4 and FIG. 5. The contention-based RA mode illustrated in FIG. 4 includes 4 steps, and the non-contention-based RA mode illustrated in FIG. 5 is divided into 2 steps. Exemplarily, specific steps of the RA procedure are the following.

Step 1: the terminal device for example a UE transmits message (Msg) 1 to the network device for example a gNB.

The terminal device selects a physical random access channel (PRACH) resource and transmits a preamble selected on the PRACH resource selected. The PRACH resource and the preamble can be assigned by a base station if there is the non-contention-based RA. The base station can estimate, according to the preamble, UL timing and a size of a grant needed for Msg3 transmission performed by the terminal device.

Step 2: the network device transmits an RAR (Msg2) to the terminal device.

The terminal device activates an RA-response window in response to transmission of the Msg1, and monitors within the window a physical downlink control channel (PDCCH) scrambled by a random access radio network temporary identifier (RA-RNTI). The RA-RNTI is related to a PRACH time-frequency resource that is used for transmission of the Msg1 by the UE.

The terminal device can obtain a physical downlink shared channel (PDSCH) scheduled by the PDCCH in response to successful reception of the PDCCH scrambled by the RA-RNTI, where the PDSCH contains an RAR. For example, specifically, the RAR may contain the following information. A sub-header of the RAR contains a back-off indicator (BI) indicating a fallback time of Msg1 retransmission. RA preamble identifier (RAPID) in the RAR: the RAPID is a preamble index received by a network response. A payload of the RAR contains a timing advance group (TAG) for adjusting UL timing. UL grant: the UL grant is a UL resource indication for scheduling Msg3. Temporary cell-radio network temporary identifier (C-RNTI): the temporary C-RNTI is for scrambling a PDCCH of Msg4 (at initial access).

If the terminal device receives the PDCCH scrambled by the RA-RNTI and the RAR contains an index of a preamble transmitted by the terminal device, the terminal device determines that the RAR is successfully received.

As illustrated in FIG. 5, for the non-contention-based RA, the RA procedure ends in response to successful reception of Msg2 by the terminal device. As illustrated in FIG. 4, for the contention-based RA, the terminal device further needs to perform Msg3 transmission and Msg4 reception in response to successful reception of the Msg2 by the terminal device.

Step 3: the terminal device transmits the Msg3 on a resource scheduled by the network device.

The Msg3 is mainly used to inform the network of a type of an event that triggers an RA procedure. For example, a UE identifier (ID) and an establishment cause may be carried in the Msg3 if there is an initial access random procedure, or a connected-UE ID and an establishment cause may be carried in the Msg3 if there is an RRC reestablishment.

Step 4: the network device transmits Msg4 to the terminal device.

The Msg4 has two functions of which one is for contention resolution and the other is for RRC configuration message transmission from the network device to the terminal device. The contention resolution has two manners: one is that the Msg4 is scheduled by a PDCCH scrambled by a C-RNTI if the UE makes the Msg3 carry the C-RNTI, and the other is that the Msg4 is scheduled by a PDCCH scrambled by a temporary C-RNTI if the UE makes the Msg3 carry no C-RNTI, e.g., initial access. The contention resolution is that the UE receives a PDSCH for the Msg4 and matches a common control channel (CCCH) service data unit (SDU) in the PDSCH.

As can be seen from the RA procedure, a main purpose of the RA is that the terminal device obtains UL synchronization with a cell. During the RA, the network device can determine a point of time at which the terminal device transmits a preamble according to an RA time-frequency resource used for receiving the preamble from the terminal device, determine an initial TA information of the terminal device according to the point of time for transmitting the preamble and a point of time for receiving the preamble, and inform the terminal device through an RAR.

Figure 6:
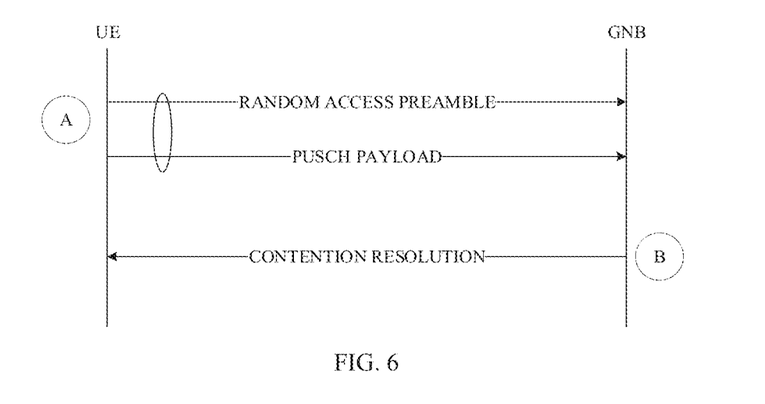
FIG. 6 is a schematic diagram illustrating a 2-step RA procedure.

For the 2-step RA, both delays and signaling overhead can be reduced. As illustrated in FIG. 6, MsgA in the 2-step RA contains a preamble propagated on a PRACH and payload information propagated on a physical uplink shared channel (PUSCH). The terminal device monitors a response at a network side within a configured window in response to transmission of the MsgA. The terminal device ends the RA procedure upon receiving an indication indicating successful contention resolution transmitted by the network device.

In implementations of the disclosure, the UE in the unconnected state such as an idle/inactive state can obtain effective TA information, and perform propagation delay compensation, to perform timing synchronization, so as to ensure that a 5G system (5GS) satisfies a timing synchronization accuracy requirement needed by the TSN.

Of course, in implementations of the disclosure, the UE in the connected state can obtain effective TA information and perform propagation delay compensation, to perform timing synchronization.

Figure 7:
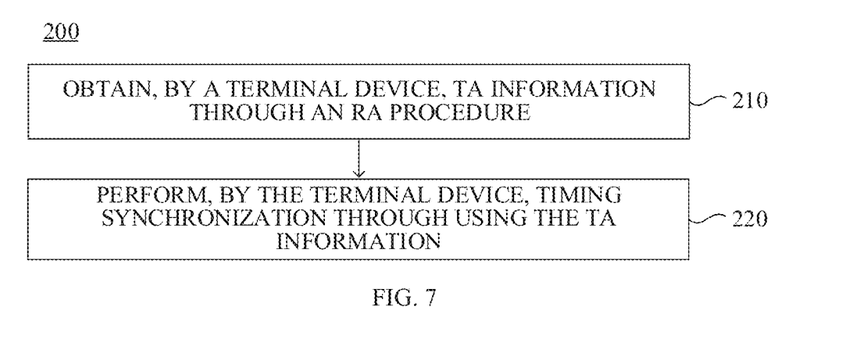
FIG. 7 is a schematic flow chart illustrating a method for timing synchronization according to an implementation of the disclosure.

FIG. 7 is a schematic flow chart illustrating a method 200 for timing synchronization according to an implementation of the disclosure. The method can be optionally applicable to the system illustrated in FIG. 1, which is not limited herein. The method includes at least part of the following.

At block 210, the terminal device obtains TA information through an RA procedure.

At block 220, the terminal device performs timing synchronization through using the TA information. Specifically, the terminal device can perform propagation delay compensation through using the TA information, to perform timing synchronization.

Optionally, in implementations of the disclosure, the RA procedure includes a 2-step RA procedure or 4-step RA procedure.

Optionally, in implementations of the disclosure, the TA information is carried in at least one of: MsgB in the 2-step RA procedure or Msg2 in the 4-step RA procedure.

In the 2-step RA procedure, the network device can transmit the MsgB carrying the TA information to the terminal device. In the 4-step RA procedure, the network device can transmit the Msg2 carrying the TA information to the terminal device.

Optionally, in implementations of the disclosure, the terminal device obtains the TA information through the RA procedure as follows. The terminal device obtains the TA information by triggering the RA procedure upon determining that the terminal device satisfies at least one of the following.

Case one: the terminal device is required to obtain effective TA information. For example, the UE is required to obtain the effective TA information upon determining that the UE has no effective TA information.

Case two: the terminal device has no effective TA information.

Case three: the terminal device is required to perform propagation delay compensation. For example, the UE can determine whether to perform propagation delay compensation according to an indication of the network device, a pre-configuration, or a situation of the UE.

Case four: the terminal device is required to perform timing synchronization. For example, a UE supporting a high accuracy synchronization requirement is required to perform timing synchronization. For another example, the UE is required to perform timing synchronization in a TSC service scenario.

In addition, a case where the terminal device determines to trigger the RA procedure further includes that the terminal device has no data to transmit.

If terminal device is required to obtain effective TA information, has no effective TA information, is required to perform propagation delay compensation, is required to perform timing synchronization, or has no data to transmit, the terminal device can actively trigger the 4-step or 2-step RA procedure, and obtain the TA information through the RA procedure. Furthermore, the terminal device performs propagation delay compensation through using the TA information, to realize timing synchronization with the network device.

Optionally, in implementations of the disclosure, the method further includes the following. The terminal device determines whether to perform propagation delay compensation according to an indication of a network device, a pre-configuration, or a situation of the terminal device. If the terminal device determines to perform propagation delay compensation, reference can be made to the above case three to trigger the RA procedure.

In an implementation, the terminal device can obtain the TA information by directly triggering the RA procedure. The terminal device can also obtain the TA information by triggering the RA procedure upon determining to perform propagation delay compensation.

Optionally, in implementations of the disclosure, a manner in which the terminal device determines whether to perform propagation delay compensation according to the indication of the network device includes at least one of: determining whether to perform propagation delay compensation according to system information, determining whether to perform propagation delay compensation according to an indication in the system information, or determining whether to perform propagation delay compensation according to an indication in a dedicated RRC.

Optionally, in implementations of the disclosure, a manner in which the terminal device determines whether to perform propagation delay compensation according to the pre-configuration includes: determining whether to perform propagation delay compensation according to a set parameter.

Optionally, in implementations of the disclosure, a manner in which the terminal device determines whether to perform propagation delay compensation according to the situation of the terminal device includes: determining whether to perform propagation delay compensation according to a device capacity. In addition, the terminal device can also try to perform propagation delay compensation on condition that timing accuracy of the terminal device is insufficient.

For example, if the system information or the dedicated RRC includes an indication indicative of that the terminal device performs propagation delay compensation, the terminal device determines to perform propagation delay compensation. If the system information or the dedicated RRC does not include the indication indicative of that the terminal device performs propagation delay compensation, the terminal device determines not to perform propagation delay compensation. If the system information or the dedicated RRC includes an indication indicative of that the terminal device does not perform propagation delay compensation, the terminal device determines not to perform propagation delay compensation.

In addition, the terminal device can also perform propagation delay compensation if the network device does not instruct the terminal device to perform propagation delay compensation.

Optionally, in implementations of the disclosure, the set parameter includes, but is not limited to a distance, a path loss (PL), or a reference signal received power (RSRP).

For example, if a distance between the terminal device and the network device reaches a certain threshold, an indication indicative of that the terminal device performs propagation delay compensation is determined.

For another example, if a PL between the terminal device and the network device reaches a certain threshold, an indication indicative of that the terminal device performs propagation delay compensation is determined.

For yet another example, if an RSRP reaches a certain threshold, an indication indicative of that the terminal device performs propagation delay compensation is determined.

For example, if the terminal device has a capacity for performing propagation delay compensation, an indication indicative of that the terminal device performs propagation delay compensation is determined.

Optionally, in implementations of the disclosure, the method further includes the following. The terminal device determines whether the terminal device has effective TA information upon determining to perform propagation delay compensation.

In an implementation, the terminal device can determine whether the terminal device has effective TA information upon determining to perform propagation delay compensation. Then in a case that the terminal device has no effective TA information, the terminal device obtains the TA information by triggering the RA procedure.

Optionally, in implementations of the disclosure, the method further includes the following. Upon determining to perform propagation delay compensation by the terminal device and that the terminal device has effective TA information, the terminal device performs propagation delay compensation, to perform timing synchronization.

Optionally, in implementations of the disclosure, the method further includes the following. The terminal device transmits first information indicating a triggering cause of the RA procedure, where the triggering cause includes at least one of: the terminal device being required to obtain effective TA information, the terminal device having no effective TA information, the terminal device being required to perform propagation delay compensation, or the terminal device being required to perform timing synchronization.

Optionally, in implementations of the disclosure, the triggering cause further includes that the terminal device has no data to transmit.

The triggering causes above can be represented with a same cause or different causes.

Optionally, in implementations of the disclosure, the first information is carried in at least one of: MsgA in the 2-step RA procedure or Msg3 in the 4-step RA procedure.

In the 2-step RA procedure, the network device can transmit MsgA carrying the first information to the terminal device. In the 4-step RA procedure, the network device can transmit Msg3 carrying the first information to the terminal device. The terminal device can obtain a cause for the terminal device to trigger the RA procedure in response to reception of the first information.

Optionally, in implementations of the disclosure, the first information is carried in the MsgA or the Msg3 through at least one of: specific information (e.g., a specific MAC CE), an RRC establishment request, an RRC reestablishment request, or an RRC resume request.

For example, a cause in the RRC establishment request in the MsgA or the Msg3 can be set to any one of the above triggering causes. If the cause in the RRC establishment request received by the network device is one of the above triggering causes, the network device can transmit at least one of an RRC establishment message, an RRC release message, or an RRC reject message to the terminal device.

For example, a cause in the RRC reestablishment request in the MsgA or the Msg3 can be set to any one of the above triggering causes. If the cause in the RRC reestablishment request received by the network device is one of the above triggering causes, the network device can transmit at least one of an RRC reestablishment message, an RRC release message, or an RRC reject message to the terminal device.

For example, a cause in the RRC resume request in the MsgA or the Msg3 can be set to any one of the above triggering causes. If the cause in the RRC resume request received by the network device is one of the above triggering causes, the network device can transmit at least one of an RRC resume message, an RRC establishment message, an RRC release message, or an RRC reject message to the terminal device.

Optionally, in implementations of the disclosure, the method further includes the following. In response to reception of an RRC establishment message or an RRC reestablishment message, the terminal device enters a connected state, and performs propagation delay compensation through using the TA information.

For example, in an unconnected state, in response to reception of the RRC establishment message or the RRC reestablishment message transmitted by the network device, the terminal device enters the connected state from the unconnected state, and performs propagation delay compensation through using the TA information.

For another example, in the connected state, the terminal device triggers the RA procedure, maintains the connected state, and performs propagation delay compensation through using the TA information.

Optionally, in implementations of the disclosure, the method further includes the following. In response to reception of an RRC release message, an RRC resume message, or an RRC reject message, the terminal device enters the unconnected state, and performs propagation delay compensation through using the TA information.

For example, in the unconnected state, in response to reception of the RRC release message, the RRC resume message, or the RRC reject message transmitted by the network device, the terminal device does not enter the connected state, and performs propagation delay compensation through using the TA information.

For another example, in the connected state, in response to reception of the RRC release message, the RRC resume message, or the RRC reject message transmitted by the network device, the terminal device leaves the connected state, and performs propagation delay compensation through using the TA information.

In implementations of the disclosure, by triggering the RA procedure by the terminal device, it can be ensured that the terminal device can obtain the effective TA information in various scenarios (e.g., in the connected state or in the unconnected state), and perform propagation delay compensation, to perform timing synchronization.

The following will take that the terminal device is a UE and the network device is a base station as an example to illustrate some specific implementations.

Implementation One

The UE in an unconnected state has no effective TA information. The UE is unable to complete timing synchronization required by a system even if the UE obtains timing synchronization information. Therefore, a method for the UE in the unconnected state to obtain TA information is provided in the implementation. In addition, for avoiding unnecessary state transition (idle/inactive→connected) of the UE, for example, in a case that the UE has no requirement such as data propagation and is required to obtain only TA information, the network device can determine whether to enable the UE to enter the connected state, according to related information. For example, the network device determines whether to transmit an establishment or reestablishment message, or a release message, a resume message, a reject message, or the like. As such, it can be ensured that the UE can obtain the effective TA information and perform propagation delay compensation, to maintain synchronization with the system. Furthermore, unnecessary state transition of the UE can also be avoided, and a complexity of the UE can be reduced.

The implementation can be applicable to the UE in the unconnected state, e.g., a UE in any of an RRC idle state or an RRC inactive state.

The implementation can be extended for a UE in a connected state.

In the implementation, the UE obtains the effective TA information through the RA procedure. The UE then performs propagation delay compensation through using all effective TA information, to perform timing synchronization. The RA procedure may include a 2-step RA procedure and/or 4-step RA procedure. For example, first information can be carried in Msg3 (in the 4-step RA procedure) or MsgA (in the 2-step RA procedure) and indicates a cause for triggering the RA procedure, where the cause includes at least one of: the UE being required to obtain effective TA information, the UE having no effective TA information, the UE being required to perform propagation delay compensation, or the UE being required to perform timing synchronization. Specifically, the first information can be carried in an RRC establishment request, an RRC reestablishment request, or an RRC resume request in the Msg3 or the MsgA. The first information can be represented as a new establishment cause, a new reestablishment cause, or a new resume cause. The base station such as a gNB determines a cause for the UE to trigger the RA procedure, according to the first information. Optionally, the gNB transmits an RRC release message or an RRC resume message to the UE.

For example, a specific implementation procedure of the implementation includes the following.
1. The UE determines whether to perform propagation delay compensation according to an indication of the network device, a pre-configuration, or a situation of the UE.

Specifically, the UE can determine whether to perform propagation delay compensation according to an indication in system information or a dedicated RRC, e.g., an indication indicative of that the UE performs/does not perform propagation delay compensation that is indicated by a network, or a parameter indicative of that the UE performs/does not perform propagation delay compensation indicated by the network (e.g., a threshold, a PL, or the like).
2. The UE determines to perform propagation delay compensation.
1) The UE is in the connected state,
A. If the UE currently has effective TA information, the UE performs propagation delay compensation according to the effective TA information, to perform timing synchronization.
B. If the UE currently has no effective TA information, the UE obtains effective TA information by triggering an RA procedure (a 2-step RA or a 4-step RA), and perform propagation delay compensation, to perform timing synchronization.

Specifically, first information is carried in Msg3 or MsgA and indicates a cause for triggering the RA procedure, where the cause includes at least one of: the UE being required to obtain effective TA information, the UE having no effective TA information, the UE being required to perform propagation delay compensation, or the UE being required to perform timing synchronization.

Specifically, the first information is represented as a triggering cause of the RA procedure. Specifically, the triggering cause may include at least one of: the UE being required to obtain effective TA information, the UE having no effective TA information, the UE being required to perform propagation delay compensation, or the UE being required to perform timing synchronization.

2) The UE is in the unconnected state, and in this case, the UE has no effective TA information, such that the UE obtains effective TA information by triggering the RA procedure (the 2-step RA or the 4-step RA), and performs propagation delay compensation, to perform timing synchronization.

Specifically, first information is carried in Msg3 or MsgA and indicates a cause for triggering the RA procedure, where the cause includes at least one of: the UE being required to obtain effective TA information, the UE having no effective TA information, the UE being required to perform propagation delay compensation, or the UE being required to perform timing synchronization.

The first information can be carried in specific information (e.g., a specific MAC CE).

The first information can also be carried in at least one of an RRC establishment request, an RRC reestablishment request, or an RRC resume request.

Specifically, the first information can be represented as a new establishment cause, a new reestablishment cause, or a new resume cause. Specifically, the new establishment cause, the new reestablishment cause, or the new resume cause may include at least one of: the UE being required to obtain effective TA information, the UE having no effective TA information, the UE being required to perform propagation delay compensation, or the UE being required to perform timing synchronization.

3) The base station determines that the UE is required to obtain effective TA information, has no effective TA information, is required to perform timing synchronization, or is required to perform propagation delay compensation, according to the RA procedure. The base station can perform the following operations.
1) The base station indicates effective TA information to the UE through using Msg2 (in the 4-step RA procedure) or MsgB (in the 2-step RA procedure).
2) The base station transmits to the UE one of an RRC establishment message, an RRC reestablishment message, an RRC release message, an RRC resume message, or an RRC reject message.

Specifically, the following cases may be included.
A. When the UE is in an inactive/idle state, according to the first information, the base station determines that the UE currently is required to perform timing synchronization, is required to obtain only TA information, is required to perform propagation delay compensation, or has no data to transmit, and then the base station transmits an RRC release message, an RRC resume message, or an RRC reject message to the UE. Correspondingly, the UE does not enter the connected state, and performs propagation delay compensation through using only the TA information, to perform timing synchronization. Alternatively, when the UE is in the inactive/idle state and triggers the RA procedure, the base station transmits an RRC establishment message or an RRC reestablishment message to the UE. Correspondingly, the UE enters the connected state, and performs propagation delay compensation through using the TA information.
B. When the UE is in a connected state, according to the first information, the base station determines that the UE currently is required to perform timing synchronization, is required to obtain only TA information, is required to perform propagation delay compensation, or has no data to transmit, and then the base station transmits an RRC release message, an RRC resume message, or an RRC reject message to the UE. Correspondingly, the UE leaves the connected state, and performs propagation delay compensation through using only the TA information, to perform timing synchronization. Alternatively, when the UE is in the connected state and triggers the RA procedure, the UE in the connected state performs propagation delay compensation through using the TA information. Correspondingly, the base station transmits an RRC establishment message or an RRC reestablishment message to the UE.
4. The UE obtains the TA information according to the operations at step 3, and performs propagation delay compensation according to the triggering cause, to perform timing synchronization.

Implementation Two

The 4-step RA procedure is taken as an example, and refer to FIG. 4 and FIG. 5 and related explanations of FIG. 4 and FIG. 5, a method for timing synchronization in implementations of the disclosure may include the following steps.

Step 1: the UE transmits Msg1 to the base station.
Step 2: the base station transmits an RAR (Msg2) to the UE. The Msg2 contains effective TA information.
Step 3: the UE transmits Msg3 on a resource scheduled by the base station. The first information is carried in the Msg3 and indicates a cause for triggering the RA procedure, where the cause includes at least one of: the UE being required to obtain effective TA information, the UE having no effective TA information, the UE being required to perform propagation delay compensation, or the UE being required to perform timing synchronization. The first information can be carried in the Msg3 through at least one of specific information (e.g., a specific MAC CE), an RRC establishment request, an RRC reestablishment request, or an RRC resume request.
Step 4: the base station transmits Msg4 to the UE. The base station determines a cause for triggering the RA procedure according to a state of the UE and the first information, and transmits a corresponding message to the UE. The message is carried in the Msg4. Correspondingly, the UE performs propagation delay compensation through using the TA information obtained, to perform timing synchronization.

If the UE is in the inactive/idle state, according to the first information, the base station determines that the UE currently is required to perform timing synchronization, is required to perform propagation delay compensation, is required to obtain only TA information, or has no data to transmit, and then the base station transmits an RRC release message, an RRC resume message, or an RRC reject message to the UE. The UE obtains TA information and performs propagation delay compensation, to perform timing synchronization. The UE does not enter the connected state, and performs propagation delay compensation through using only the TA information, to perform timing synchronization.

If the UE is in the inactive/idle state and triggers the RA procedure, the base station transmits an RRC establishment message or an RRC reestablishment message to the UE. Correspondingly, the UE enters the connected state, and performs propagation delay compensation through using the TA information, to perform timing synchronization.

If the UE is in the connected state, according to the first information, the base station determines that the UE currently is required to perform timing synchronization, is required to obtain only TA information, is required to perform propagation delay compensation, or has no data to transmit, and then the base station transmits an RRC release message, an RRC resume message, or an RRC reject message to the UE. Correspondingly, the UE leaves the connected state, and performs propagation delay compensation through using only the TA information, to perform timing synchronization.

If the UE is in the connected state and triggers the RA procedure, the UE in the connected state performs propagation delay compensation through using the TA information. Correspondingly, the base station transmits an RRC establishment message or an RRC reestablishment message to the UE.

Implementation Three

The 2-step RA procedure is taken as an example, and refer to FIG. 6 and related explanations of FIG. 6, a method for timing synchronization in implementations of the disclosure may include the following steps.

Step A: the UE transmits MsgA to the base station. The first information is carried in the MsgA and indicates a cause for triggering the RA procedure, where the cause includes at least one of: the UE being required to obtain effective TA information, the UE having no effective TA information, the UE being required to perform propagation delay compensation, or the UE being required to perform timing synchronization. The first information can be carried in the MsgA through at least one of specific information (e.g., a specific MAC CE), an RRC establishment request, an RRC reestablishment request, or an RRC resume request.

Step B: the UE monitors a response MsgB of the base station within a configured window. The MsgB contains effective TA information.

The base station determines a cause for triggering the RA procedure according to a state of the UE and the first information, and transmits a corresponding message to the UE. The message is carried in the MsgB transmitted from the base station to the UE. Correspondingly, the UE performs propagation delay compensation through using the TA information obtained, to perform timing synchronization.

If the UE is in the inactive/idle state, according to the first information, the base station determines that the UE currently is required to perform timing synchronization, is required to obtain only TA information, is required to perform propagation delay compensation, or has no data to transmit, and then the base station transmits an RRC release message, an RRC resume message, or an RRC reject message to the UE. The UE obtains TA information, and performs propagation delay compensation, to perform timing synchronization. The UE does not enter the connected state, and performs propagation delay compensation through using only the TA information, to perform timing synchronization.

If the UE is in the inactive/idle state and triggers the RA procedure, the base station transmits an RRC establishment message or an RRC reestablishment message to the UE. Correspondingly, the UE enters the connected state, and performs propagation delay compensation through using the TA information, to perform timing synchronization.

If the UE is in the connected state, according to the first information, the base station determines that the UE currently is required to perform timing synchronization, is required to obtain only TA information, is required to perform propagation delay compensation, or has no data to transmit, and then the base station transmits an RRC release message, an RRC resume message, or an RRC reject message to the UE. Correspondingly, the UE leaves the connected state, and performs propagation delay compensation through using only the TA information, to perform timing synchronization.

If the UE is in the connected state and triggers the RA procedure, the UE in the connected state performs propagation delay compensation through using the TA information. Correspondingly, the base station transmits an RRC establishment message or an RRC reestablishment message to the UE.

Since the UE is required to perform propagation delay compensation according to the TA information, to maintain timing synchronization with the base station, a method for obtaining the TA information is provided in implementations of the disclosure. By triggering the RA procedure, it can be ensured that the UE can obtain the effective TA information in various scenarios (e.g., in the connected state or the unconnected state), and perform propagation delay compensation, to maintain timing synchronization with the system. Furthermore, unnecessary state transition of the UE can also be avoided, and a complexity of the UE can be reduced.

Figure 8:
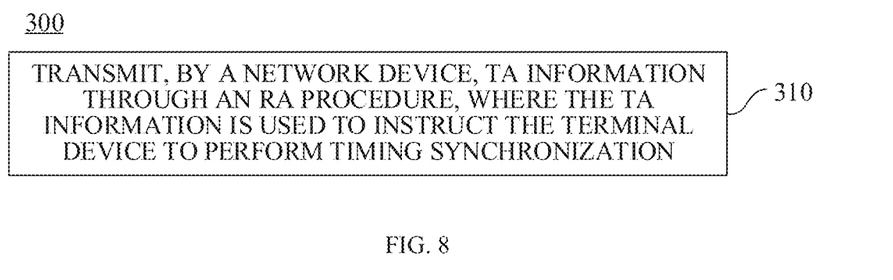
FIG. 8 is a schematic flow chart illustrating a method for timing synchronization according to another implementation of the disclosure.

FIG. 8 is a schematic flow chart illustrating a method 300 for timing synchronization according to an implementation of the disclosure. The method can be optionally applicable to the system illustrated in FIG. 1, which is not limited herein. The method includes at least part of the following.

At block 310, the network device transmits TA information through an RA procedure, where the TA information is used to instruct the terminal device to perform timing synchronization. Specifically, the TA information can be used to instruct the terminal device to perform propagation delay compensation to perform timing synchronization.

Optionally, in implementations of the disclosure, the RA procedure includes a 2-step RA procedure or 4-step RA procedure.

Optionally, in implementations of the disclosure, the network device transmits the TA information through the RA procedure as follows. The network device transmits the TA information through the RA procedure upon determining that the terminal device satisfies at least one of: the terminal device being required to obtain effective TA information, the terminal device having no effective TA information, the terminal device being required to perform propagation delay compensation, or the terminal device being required to perform timing synchronization.

Optionally, in implementations of the disclosure, a case where the terminal device determines to trigger the RA procedure further comprises that the terminal device has no data to transmit.

Optionally, in implementations of the disclosure, the TA information is carried in at least one of: MsgB in a 2-step RA procedure or Msg2 in a 4-step RA procedure.

Optionally, in implementations of the disclosure, the method further includes the following. The network device receives first information indicating a triggering cause of the RA procedure, where the triggering cause includes at least one of: the terminal device being required to obtain effective TA information, the terminal device having no effective TA information, the terminal device being required to perform propagation delay compensation, or the terminal device being required to perform timing synchronization.

Optionally, in implementations of the disclosure, the triggering cause further comprises that the terminal device has no data to transmit.

Optionally, in implementations of the disclosure, the first information is carried in at least one of: MsgA in the 2-step RA procedure or Msg3 in the 4-step RA procedure.

Optionally, in implementations of the disclosure, the first information is carried in the MsgA or the Msg3 through at least one of: specific information (e.g., a specific MAC CE), an RRC establishment request, an RRC reestablishment request, or a resume request.

Optionally, in implementations of the disclosure, the method further includes the following. The network device determines a cause for the terminal device to trigger the RA procedure, according to the first information.

Optionally, in implementations of the disclosure, the method further includes the following. The network device determines to transmit a response message or determines a connected state that the terminal device is required to enter, according to the first information.

Optionally, in implementations of the disclosure, the method further includes the following. The network device transmits an RRC establishment message or an RRC reestablishment message, upon determining that the terminal device has no effective TA information, is required to perform propagation delay compensation, is required to perform timing synchronization, or has no data to transmit according to the first information.

For example, the terminal device is in the unconnected state, and the network device determines a cause for the terminal device to trigger the RA procedure, according to the first information. If the RRC establishment request carries one of the above triggering causes, the network device can transmit to the terminal device at least one of an RRC establishment message, an RRC release message, or an RRC reject message. If the RRC reestablishment request carries one of the above triggering causes, the network device can transmit to the terminal device at least one of an RRC reestablishment message, an RRC release message, or an RRC reject message. If the RRC resume request carries one of the above triggering causes, the network device can transmit to the terminal device at least one of an RRC resume message, an RRC establishment message, an RRC release message, or an RRC reject message. In response to reception of the RRC establishment message or the RRC reestablishment message transmitted by the network device, the terminal device enters the connected state from the unconnected state, and performs propagation delay compensation through using the TA information.

For another example, on condition that the terminal device in the connected state triggers the RA procedure, the terminal device can maintain the connected state, and perform propagation delay compensation through using the TA information.

Optionally, in implementations of the disclosure, the method further includes the following. The network device transmits an RRC release message, an RRC resume message, or an RRC reject message, upon determining that the terminal device is required to perform timing synchronization, is required to obtain only effective TA information, is required to perform propagation delay compensation, or has no data to transmit according to the first information.

For example, the terminal device is in the unconnected state, and the network device determines a cause for the terminal device to trigger the RA procedure, according to the first information. If the triggering cause is determined as that the terminal device is required to perform timing synchronization, is required to obtain only effective TA information, is required to perform propagation delay compensation, or has no data to transmit, the network device transmits an RRC release message, an RRC resume message, or an RRC reject message. In response to reception of the RRC release message, the RRC resume message, or the RRC reject message transmitted by the network device, the terminal device does not enter the connected state, and performs propagation delay compensation through using the TA information.

For another example, when the terminal device is in the connected state, and the triggering cause obtained by the network device according to the first information is that the terminal device is required to perform timing synchronization, is required to obtain only effective TA information, is required to perform propagation delay compensation, or has no data to transmit, the network device transmits an RRC release message, an RRC resume message, or an RRC reject message. In response to reception of the RRC release message, the RRC resume message, or the RRC reject message transmitted by the network device, the terminal device leaves the connected state, and performs propagation delay compensation through using the TA information.

In the implementations, for specific implementations of that the network device performs the method 300, reference can be made to the related illustration of the network device such as the base station in the method 200 above, which will not be repeated herein for the sake of simplicity.

Figure 9:
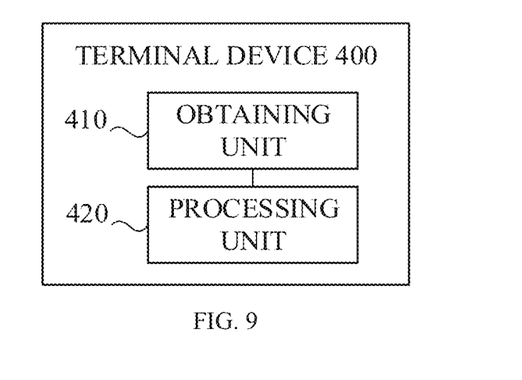
FIG. 9 is a schematic block diagram illustrating a terminal device according to an implementation of the disclosure.

FIG. 9 is a schematic block diagram illustrating a terminal device 400 according to an implementation of the disclosure. The terminal device 400 may include an obtaining unit 410 and a processing unit 420. The obtaining unit 410 is configured to obtain TA information through an RA procedure. The processing unit 420 is configured to perform timing synchronization through using the TA information.

Optionally, in implementations of the disclosure, the processing unit is further configured to perform propagation delay compensation through using the TA information, to perform timing synchronization.

Optionally, in implementations of the disclosure, the RA procedure includes a 2-step RA procedure or 4-step RA procedure.

Optionally, in implementations of the disclosure, the obtaining unit 410 is further configured to obtain the TA information by triggering the RA procedure upon determining that the terminal device satisfies at least one of: the terminal device being required to obtain effective TA information, the terminal device having no effective TA information, the terminal device being required to perform propagation delay compensation, or the terminal device being required to perform timing synchronization.

Optionally, in implementations of the disclosure, a case where the terminal device determines to trigger the RA procedure further includes that the terminal device has no data to transmit.

Optionally, in implementations of the disclosure, the TA information is carried in at least one of MsgB in the 2-step RA procedure or Msg2 in the 4-step RA procedure.

Optionally, in implementations of the disclosure, upon determining to perform propagation delay compensation by the terminal device and that the terminal device has effective TA information, the processing unit 420 is further configured to perform propagation delay compensation, to perform timing synchronization.

Figure 10:
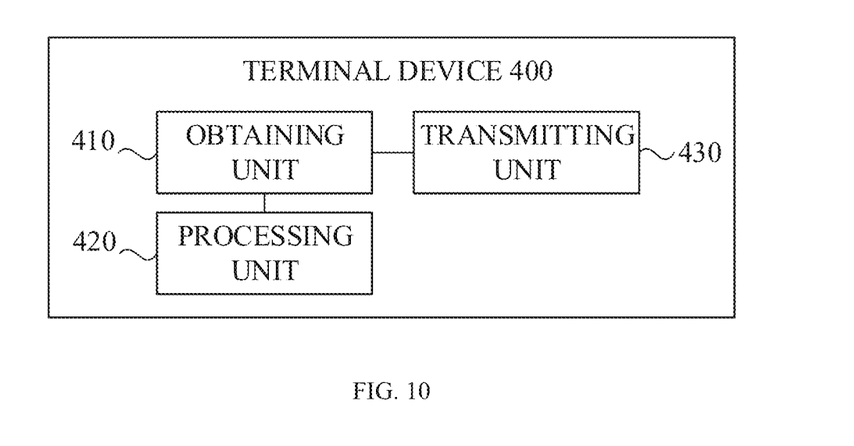
FIG. 10 is a schematic block diagram illustrating a terminal device according to another implementation of the disclosure.

Optionally, in implementations of the disclosure, as illustrated in FIG. 10, the terminal device 400 further includes a transmitting unit 430. The transmitting unit 430 is configured to transmit first information indicating a triggering cause of the RA procedure, where the triggering cause includes at least one of: the terminal device being required to obtain effective TA information, the terminal device having no effective TA information, the terminal device being required to perform propagation delay compensation, or the terminal device being required to perform timing synchronization.

Optionally, in implementations of the disclosure, the triggering cause further includes that the terminal device has no data to transmit.

Optionally, in implementations of the disclosure, the first information is carried in at least one of: MsgA in the 2-step RA procedure or Msg3 in the 4-step RA procedure.

Optionally, in implementations of the disclosure, the first information is carried in the MsgA or the Msg3 through at least one of: specific information (e.g., a specific MAC CE), an RRC establishment request, an RRC reestablishment request, or an RRC resume request.

Optionally, in implementations of the disclosure, the processing unit 420 is further configured to enable the terminal device to enter a connected state in response to reception of an RRC establishment message or an RRC reestablishment message by the terminal device, and perform propagation delay compensation through using the TA information.

Optionally, in implementations of the disclosure, the processing unit 420 is further configured to enable the terminal device to enter an unconnected state in response to reception of an RRC release message, an RRC resume message, or an RRC reject message by the terminal device, and perform propagation delay compensation through using the TA information.

Optionally, in implementations of the disclosure, the processing unit 420 is further configured to determine whether to perform propagation delay compensation according to an indication of a network device, a pre-configuration, or a situation of the processing unit.

Optionally, in implementations of the disclosure, a manner in which the processing unit 420 determines whether to perform propagation delay compensation includes at least one of: determining whether to perform propagation delay compensation according to system information, determining whether to perform propagation delay compensation according to an indication in the system information, determining whether to perform propagation delay compensation according to an indication in a dedicated RRC, determining whether to perform propagation delay compensation according to a set parameter or determining whether to perform propagation delay compensation according to a device capacity.

Optionally, in implementations of the disclosure, the parameter includes: a distance, a PL, or an RSRP.

Optionally, in implementations of the disclosure, the processing unit is further configured to determine whether the terminal device has effective TA information upon determining to perform propagation delay compensation.

It can be understood that, according to implementations of the disclosure, the above-mentioned and other operations and/or functions of each unit in the terminal device respectively implement a corresponding process performed by the terminal device in the method 200 as illustrated in FIG. 7, which will not be repeated herein for the sake of simplicity.

Figure 11:
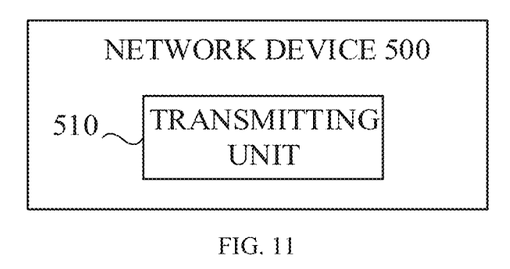
FIG. 11 is a schematic block diagram illustrating a network device according to an implementation of the disclosure.

FIG. 11 is a schematic block diagram illustrating a network device 500 according to an implementation of the disclosure. The network device 500 includes a transmitting unit 510. The transmitting unit 510 is configured to transmit TA information through an RA procedure, where the TA information is used to instruct a terminal device to perform timing synchronization.

Optionally, in implementations of the disclosure, the TA information is used to instruct the terminal device to perform propagation delay compensation to perform timing synchronization.

Optionally, in implementations of the disclosure, the RA procedure includes a 2-step RA procedure or 4-step RA procedure.

Optionally, in implementations of the disclosure, the transmitting unit 510 is further configured to transmit the TA information through the RA procedure upon determining that the terminal device satisfies at least one of: the terminal device being required to obtain effective TA information, the terminal device having no effective TA information, the terminal device being required to perform propagation delay compensation, or the terminal device being required to perform timing synchronization.

Optionally, in implementations of the disclosure, a case where the terminal device determines to trigger the RA procedure further includes that the terminal device has no data to transmit.

Optionally, in implementations of the disclosure, the TA information is carried in at least one of: MsgB in a 2-step RA procedure or Msg2 in a 4-step RA procedure.

Figure 12:
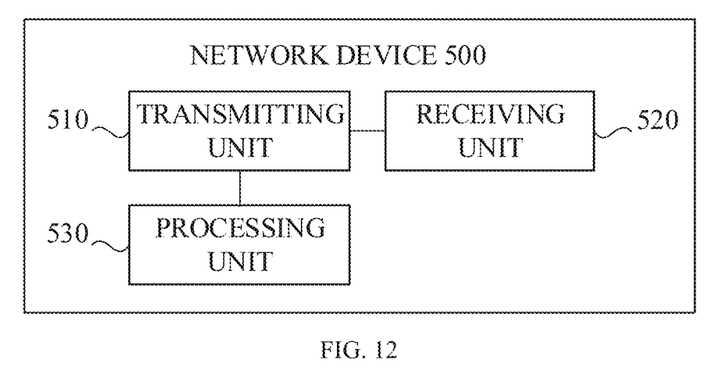
FIG. 12 is a schematic block diagram illustrating a network device according to another implementation of the disclosure.

Optionally, in implementations of the disclosure, as illustrated in FIG. 12, the network device further includes a receiving unit 520. The receiving unit 520 is configured to receive first information indicating a triggering cause of the RA procedure, where the triggering cause includes at least one of: the terminal device being required to obtain effective TA information, the terminal device having no effective TA information, the terminal device being required to perform propagation delay compensation, or the terminal device being required to perform timing synchronization.

Optionally, in implementations of the disclosure, the triggering cause further includes that the terminal device has no data to transmit.

Optionally, in implementations of the disclosure, the first information is carried in at least one of: MsgA in the 2-step RA procedure or Msg3 in the 4-step RA procedure.

Optionally, in implementations of the disclosure, the first information is carried in the MsgA or the Msg3 through at least one of: specific information (e.g., a specific MAC CE), an RRC establishment request, an RRC reestablishment request, or an RRC resume request.

Optionally, in implementations of the disclosure, the network device further includes a processing unit 530. The processing unit 530 is configured to determine a cause for the terminal device to trigger the RA procedure, according to the first information.

Optionally, in implementations of the disclosure, the processing unit is further configured to determine to transmit which response message or determine a connected state that the terminal device is required to enter, according to the first information.

Optionally, in implementations of the disclosure, the transmitting unit 510 is further configured to transmit an RRC establishment message or an RRC reestablishment message upon determining, according to the first information, that the terminal device has no effective TA information or is required to perform propagation delay compensation.

Optionally, in implementations of the disclosure, the transmitting unit 510 is further configured to transmit an RRC release message, an RRC resume message, or an RRC reject message, upon determining, according to the first information, that the terminal device is required to perform timing synchronization, is required to obtain only effective TA information, is required to perform propagation delay compensation, or has no data to transmit.

It can be understood that, according to implementations of the disclosure, the above-mentioned and other operations and/or functions of each unit in the network device respectively implement a corresponding process performed by the network device in the method 300 as illustrated in FIG. 8, which will not be repeated herein for the sake of simplicity.

Figure 13:
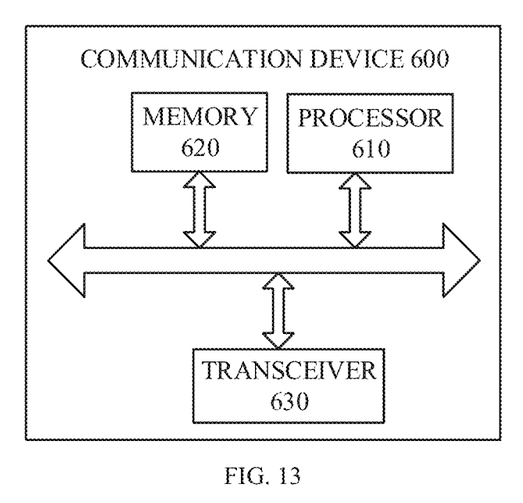
FIG. 13 is a schematic block diagram illustrating a communication device according to implementations of the disclosure.

FIG. 13 is a schematic structural diagram illustrating a communication device 600 according to implementations of the disclosure. As illustrated in FIG. 13, the communication device 600 includes a processor 610. The processor 610 is configured to invoke and execute computer programs stored in a memory, to perform the methods in the implementations of the disclosure.

Optionally, as illustrated in FIG. 13, the communication device 600 further includes a memory 620. The processor 610 is configured to invoke and execute computer programs stored in the memory 620, to perform the methods in the implementations of the disclosure.

The memory 620 may be a separate device from the processor 610, or be integrated into the processor 610.

Optionally, as illustrated in FIG. 13, the communication device 600 further includes a transceiver 630. The processor 610 can control the transceiver 630 to communicate with other devices. Specifically, the transceiver 630 can transmit information or data to other devices, or receive information or data transmitted by other devices.

The transceiver 630 may include a transmitter and a receiver, and further include one or more antennas.

Optionally, the communication device 600 may be the network device in the implementations of the disclosure, and the communication device 600 can implement a corresponding process implemented by the network device in each of the methods of the implementations of the disclosure, which will not be repeated herein for the sake of simplicity.

Optionally, the communication device 600 may be the terminal device in the implementations of the disclosure, and the communication device 600 can implement a corresponding process implemented by the terminal device in each of the methods of the implementations of the disclosure, which will not be repeated herein for the sake of simplicity.

Figure 14:
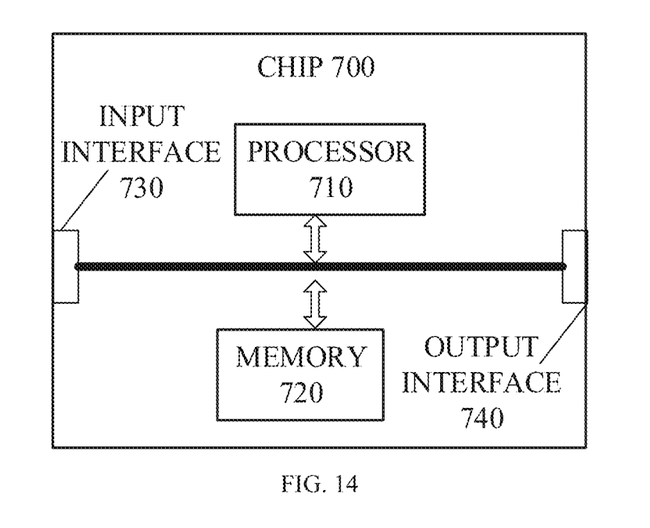
FIG. 14 is a schematic block diagram illustrating a chip according to implementations of the disclosure.

FIG. 14 is a schematic structural diagram illustrating a chip 700 according to implementations of the disclosure. As illustrated in FIG. 14, the chip 700 includes a processor 710. The processor 710 is configured to invoke and execute computer programs stored in a memory, to perform the methods in the implementations of the disclosure.

Optionally, as illustrated in FIG. 14, the chip 700 further includes a memory 720. The processor 710 is configured to invoke and execute computer programs stored in the memory 720, to perform the methods in the implementations of the disclosure.

The memory 720 may be a separate device from the processor 710, or be integrated into the processor 710.

Optionally, the chip 700 may further include an input interface 730. The processor 710 can control the input interface 730 to communicate with other devices or chips. Specifically, the input interface 730 can obtain information or data transmitted by other devices or chips.

Optionally, the chip 700 may further include an output interface 740. The processor 710 can control the output interface 740 to communicate with other devices or chips. Specifically, the output interface 740 can output information or data to other devices or chips.

Optionally, the chip can be applied to the network device in the implementations of the disclosure, and the chip can implement a corresponding process implemented by the network device in each of the methods in the implementations of the disclosure, which will not be repeated herein for the sake of simplicity.

Optionally, the chip can be applied to the terminal device in the implementations of the disclosure, and the chip can implement a corresponding process implemented by the terminal device in each of the methods in the implementations of the disclosure, which will not be repeated herein for the sake of simplicity.

It can be understood that, the chip mentioned in the implementations of the disclosure may be a system-level chip, a system chip, a chip system, a system-on-a-chip chip, or the like.

The processor mentioned-above may be a general-purpose processor, a digital signal processor (DSP), a field programmable gate array (FPGA), an application specific integrated circuit (ASIC), other programmable logic devices, transistor logic devices, or discrete hardware components. The general-purpose processor mentioned-above may be a microprocessor or may also be any conventional processor, or the like.

The memory mentioned-above may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory can be a random access memory (RAM).

It can be understood that, the above-mentioned memory is an example but not limitation. For example, in implementations of the disclosure, the memory may also be a static RAM (SRAM), a dynamic RAM (DRAM), a synchronous DRAM (SDRAM), a double data rate SDRAM (DDR SDRAM), an enhanced SDRAM (ESDRAM), or a synch link DRAM (SLDRAM), and a direct rambus RAM (DR RAM). That is to say, in implementations of the disclosure, the memory is intended to include, but is not limited to, these and any other suitable types of memory.

Figure 15:
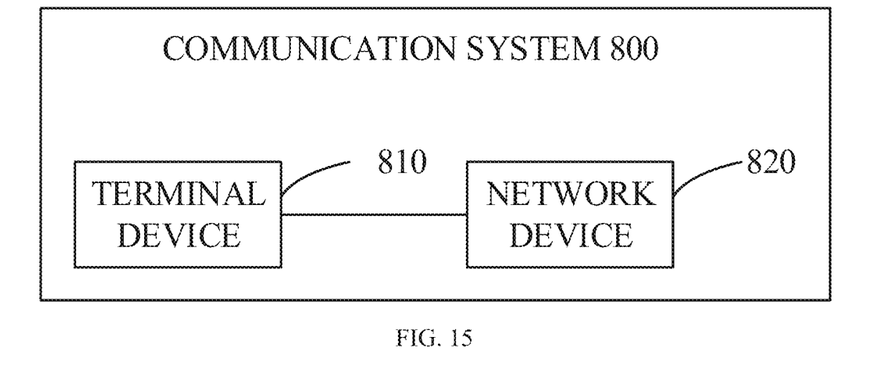
FIG. 15 is a schematic block diagram illustrating a communication system according to implementations of the disclosure.

FIG. 15 is a schematic block diagram illustrating a communication system 800 according to implementations of the disclosure. As illustrated in FIG. 15, the communication system 800 includes a terminal device 810 and a network device 820.

The terminal device 810 is configured to obtain TA information through an RA procedure, and perform timing synchronization through using the TA information. The network device 820 is configured to transmit the TA information through the RA procedure, where the TA information is used to instruct the terminal device to perform timing synchronization.

The terminal device 810 can be configured to implement a corresponding function implemented by the terminal device in the above methods, and the network device 820 can be configured to implement a corresponding process implemented by the network device in the above methods, which will not be repeated herein for the sake of simplicity.

In the above-mentioned implementations, all or part of the above implementations can be implemented through software, hardware, firmware, or any other combination thereof. When implemented by software, all or part of the above implementations can be implemented in the form of a computer program product. The computer program product includes one or more computer instructions. When the computer program instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one web site, computer, server, or data center to another web site, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It should be understood that, in various implementations of the disclosure, the magnitude of a sequence number of each process mentioned above does not mean an order of execution, and the order of execution of each process should be determined by its function and an internal logic and shall not constitute any limitation to an implementation process of implementations of the disclosure.

It may be evident to those skilled in the art that, for the sake of convenience and simplicity, in terms of the specific working processes of the foregoing systems, apparatuses, and units, reference can be made to the corresponding processes of the above-mentioned method implementations, which will not be repeated herein.

The above is only a specific implementation of the disclosure and is not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for timing synchronization, comprising:
obtaining, by a terminal device in an unconnected state, timing advance (TA) information through a random access (RA) procedure upon that the terminal device has no data to transmit and the terminal device is required to perform propagation delay compensation, and transmitting, by the terminal device, first information indicating a triggering cause of the RA procedure to a network device, wherein the first information is carried in message A (MsgA) in a 2-step RA procedure or in Msg3 in a 4-step RA procedure through at least one of: a radio resource control (RRC) establishment request, an RRC reestablishment request, or an RRC resume request, and wherein the triggering cause comprises that the terminal device has no data to transmit and that the terminal device is required to perform propagation delay compensation; and upon reception of an RRC reject message, an RRC release message, or an RRC resume message transmitted by the network device, remaining, by the terminal device, in the unconnected state and performing, by the terminal device, propagation delay compensation based on the TA information, to perform timing synchronization.

2. The method of claim 1, further comprising:

upon determining to perform propagation delay compensation based on the TA information by the terminal device and that the terminal device has effective TA information, performing, by the terminal device, propagation delay compensation based on the TA information, to perform timing synchronization.

3. The method of claim 1, further comprising:

enabling the terminal device to enter a connected state in response to reception of an RRC establishment message or an RRC reestablishment message by the terminal device; and performing propagation delay compensation based on the TA information.

4. A terminal device, comprising:

a processor; and a memory storing a computer program;

wherein the computer program being executed by the processor to cause the terminal device to:

obtain, when the terminal device is in an unconnected state, timing advance (TA) information through a random access (RA) procedure upon that the terminal device has no data to transmit and the terminal device is required to perform propagation delay compensation, and transmit first information indicating a triggering cause of the RA procedure to a network device, wherein the first information is carried in message A (MsgA) in a 2-step RA procedure or in Msg3 in a 4-step RA procedure through at least one of: a radio resource control (RRC) establishment request, an RRC reestablishment request, or an RRC resume request, and wherein the triggering cause comprises that the terminal device has no data to transmit and that the terminal device is required to perform propagation delay compensation; and upon reception of an RRC reject message, an RRC release message, or an RRC resume message transmitted by the network device, remain in the unconnected state and perform propagation delay compensation based on the TA information, to perform timing synchronization.

5. The terminal device of claim 4, wherein the computer program is further executed by the processor to cause the terminal device to:

perform, upon determining to perform propagation delay compensation based on the TA information by the terminal device and that the terminal device has effective TA information, propagation delay compensation based on the TA information, to perform timing synchronization.

6. The terminal device of claim 4, wherein the computer program is further executed by the processor to cause the terminal device to:

enable the terminal device to enter a connected state in response to reception of an RRC establishment message or an RRC reestablishment message by the terminal device; and perform propagation delay compensation based on the TA information.

7. A non-transitory computer-readable storage medium storing a computer program, the computer program being executed by a terminal device to:

obtain, when the terminal device is in an unconnected state, timing advance (TA) information through a random access (RA) procedure upon that the terminal device has no data to transmit and the terminal device is required to perform propagation delay compensation, and transmit first information indicating a triggering cause of the RA procedure to a network device, wherein the first information is carried in message A (MsgA) in a 2-step RA procedure or in Msg3 in a 4-step RA procedure through at least one of: a radio resource control (RRC) establishment request, an RRC reestablishment request, or an RRC resume request, and wherein the triggering cause comprises that the terminal device has no data to transmit and that the terminal device is required to perform propagation delay compensation; and upon reception of an RRC reject message, an RRC release message, or an RRC resume message transmitted by the network device, remaining, by the terminal device, in the unconnected state and perform propagation delay compensation based on the TA information, to perform timing synchronization.

8. The non-transitory computer-readable storage medium of claim 7, wherein the computer program is further executed by the terminal device to:

perform propagation delay compensation based on the TA information, to perform timing synchronization, upon determining to perform propagation delay compensation based on the TA information by the terminal device and that the terminal device has effective TA information.

9. The non-transitory computer-readable storage medium of claim 7, wherein the computer program is further executed by the terminal device to:

enable the terminal device to enter a connected state in response to reception of a an RRC establishment message or an RRC reestablishment message by the terminal device; and perform propagation delay compensation based on the TA information.

* * * * *